United States Patent
Puschmann (10) Patent No.: US 12,337,981 B2
(45) Date of Patent: Jun. 24, 2025

(54) VARIABLE FAIRING FOR A HYDROGEN DUCT SYSTEM INSTALLATION AND USES OF THE SAME

(71) Applicant: Airbus Operations GmbH, Hamburg (DE)

(72) Inventor: Carsten Puschmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 2 days.

(21) Appl. No.: 18/338,539

(22) Filed: Jun. 21, 2023

(65) Prior Publication Data
US 2023/0415907 A1 Dec. 28, 2023

(30) Foreign Application Priority Data
Jun. 23, 2022 (EP) ..................................... 22180620

(51) Int. Cl.
*B64D 29/08* (2006.01)
*B64C 7/00* (2006.01)
*B64D 37/14* (2006.01)
*B64D 37/30* (2006.01)

(52) U.S. Cl.
CPC ................ *B64D 29/08* (2013.01); *B64C 7/00* (2013.01); *B64D 37/14* (2013.01); *B64D 37/30* (2013.01)

(58) Field of Classification Search
CPC ......... B64D 37/30; B64D 37/32; B64D 37/00
See application file for complete search history.

(56) References Cited

U.S. PATENT DOCUMENTS

| 7,458,542 | B2 | 12/2008 | Chow et al. |
| 8,056,344 | B2 * | 11/2011 | Remy ........................ F02C 3/30 60/776 |
| 2006/0196633 | A1 * | 9/2006 | Mahjoub ................... B64C 7/00 165/41 |
| 2008/0099611 | A1 * | 5/2008 | Martino Gonzalez ....................... B64D 29/08 244/119 |
| 2015/0336680 | A1 | 11/2015 | Schumacher et al. |
| 2016/0229546 | A1 * | 8/2016 | Chavignier ......... F16H 25/2021 |
| 2019/0393531 | A1 | 12/2019 | Hoffjann et al. |

(Continued)

FOREIGN PATENT DOCUMENTS

| DE | 102014107316 A1 | 11/2015 |
| EP | 1615819 B1 | 11/2006 |
| EP | 3040276 A1 | 7/2016 |

(Continued)

OTHER PUBLICATIONS

European Search Report for corresponding European Patent Application No. 22180620.1 dated Dec. 5, 2022; priority document.

(Continued)

*Primary Examiner* — Timothy D Collins
*Assistant Examiner* — Eric Acosta
(74) *Attorney, Agent, or Firm* — Greer, Burns & Crain, Ltd.

(57) ABSTRACT

A variable fairing for covering a hydrogen duct system installation on the outside of an aircraft part, wherein the fairing comprises at least one fairing body to be mounted on the aircraft part, an air inlet and an air outlet and at least one movable closure mechanism configured to open and close a top portion of the fairing.

14 Claims, 4 Drawing Sheets

(56) References Cited

U.S. PATENT DOCUMENTS

2020/0398992 A1 12/2020 Morrison
2021/0078702 A1 3/2021 Ciet et al.

FOREIGN PATENT DOCUMENTS

| FR | 3096029 A1 | 11/2020 |
| WO | 2021148335 A1 | 7/2021 |
| WO | 2021148336 A1 | 7/2021 |

OTHER PUBLICATIONS

Wikipedia, "Aircraft Fairing" retrieved from https://en.wikipedia.org/wiki/Aircraft_fairing, download on Jun. 15, 2022.

* cited by examiner

VARIABLE FAIRING FOR A HYDROGEN DUCT SYSTEM INSTALLATION AND USES OF THE SAME

CROSS-REFERENCES TO RELATED APPLICATIONS

This application claims the benefit of the European patent application No. 22180620.1 filed on Jun. 23, 2022, the entire disclosures of which are incorporated herein by way of reference.

FIELD OF THE INVENTION

The invention relates to a variable fairing for covering an installation on the outside of an aircraft part. Further, the invention relates to an arrangement of the installation and the variable fairing, and an aircraft equipped therewith.

BACKGROUND OF THE INVENTION

For technical background of the invention reference is made to the following citations:
[1] DE 10 2014 107 316 A1
[2] US 202/0 078 702A1
[3] WO 2021/148 335A1
[4] Aircraft fairing—Wikipedia, https://en.wikipedia.org/wiki/Aircraft_fairing, download on 15 Jun. 2022
[5] EP 1 615 819 B1

[1] to [3] relate to hydrogen installations in an aircraft. [4] and [5] relate to aircraft fairings. A fairing (for aircraft) is a structure whose primary function is to produce a smooth outline and reduce drag. These structures are covers for gaps and spaces between parts of an aircraft or to cover installations to reduce form drag and interference drag, and to improve appearance.

SUMMARY OF THE INVENTION

An object of the invention is to provide a simple possibility for further improving security of a hydrogen system installation during different operation conditions.

The invention provides a variable fairing for covering a hydrogen duct system and equipment installation on the outside of an aircraft part, wherein the fairing comprises at least one fairing body to be mounted on the aircraft part, an air inlet and an air outlet and at least one movable closure mechanism opening and closing a top portion of the fairing.

Preferably, the aircraft part is a fuselage of the aircraft. Hence, the fairing is preferably configured for covering a hydrogen duct system and equipment installation mounted outside of a fuselage of an aircraft. Most preferred, the hydrogen duct installation or the hydrogen equipment is mounted on the top of the fuselage. Hence, the fairing is preferably configured for covering a hydrogen duct system and equipment installation mounted outside of the fuselage, namely on top of the fuselage.

Preferably, the closure mechanism comprises a first faring door. Preferably, the closure mechanism comprises a second fairing door. Preferably, the closure mechanism comprises an actuating apparatus for driving a movement of the closure mechanism.

Preferably, the first and the second fairing door are split along the longitudinal axis of the fairing body and/or of the fuselage. Preferably, the at least one fairing door is configured to be hinged to the aircraft part, especially to the fuselage.

Preferably, the air inlet and the air outlet are fixed openings in the fairing body.

Preferably, the variable fairing comprises a control for controlling actuation of the movable closure mechanism and/or opening and closing status of the variable fairing. Especially, the control is configured to control an actuating apparatus for the movable closure mechanism. Especially, the control is configured to initiate and stop movement of the closure mechanism.

The closure mechanism is configured to be moved between at least one open position and a closing position. Especially, the closure mechanism can be moved to a fully open position (end position), to a fully closed position and at least one or several or any intermediate position between the fully opened and the fully closed position. Preferably, the control comprises an electric or electronic processing unit. The control can be provided as hardware or software. The control can be part of the actuating apparatus or can be decentral or central control. Especially, the control can be part of a control system of the aircraft.

Preferably, the control is configured to control the movable closure mechanism depending on a flight condition of the aircraft. For example, the closure mechanism is moved in a closed position and/or kept in a closing position, especially the fully closed position, during flight of the aircraft. Preferably, the control is configured to control the movable closure mechanism depending on an aircraft speed. For example, the closure mechanism is moved in an open position, especially an intermediate position with a smaller opening of the top portion of the fairing, during flight with lower speed and is fully closed and kept closed during a flight with higher speed. The grade of opening can be controlled depending on the speed of the aircraft during flight or on ground during taxi and rolling. Preferably, the control is configured to control the movable closure mechanism depending on a ground condition of the aircraft. For example, the movable closure mechanism is fully opened at the parking position of the aircraft or when the aircraft is not moved due to any other reason. Preferably, the control is configured to control the movable closure mechanism depending on a hydrogen accumulation within the fairing.

Preferably, the variable fairing including the control is configured such that at least one, several or all of the aforementioned control operations are conducted in an automatic mode automatically according to routine operations. Of course, a manual mode is also possible.

According to another aspect, the invention provides a hydrogen duct system arrangement for an aircraft, comprising hydrogen duct system and equipment installation to be mounted on an aircraft outside of an aircraft part and a variable fairing according to any of the aforementioned embodiments for covering the hydrogen duct system and equipment installation.

Preferably, the hydrogen duct system installation comprises at least one pipe for transporting hydrogen (hereinafter H2), especially liquid H2 or gaseous H2. Preferably, the hydrogen duct system installation comprises at least one pipe coupling. Preferably, the hydrogen duct system installation comprises at least one component of a H2 feed unit for supplying a hydrogen consumer of the aircraft with hydrogen. Preferably, the hydrogen duct system installation comprises at least one valve, especially automatic valve or controllable ventil. Preferably, the hydrogen duct system installation comprises at least one vent system for releasing H2 to the outside. Preferably, the hydrogen duct system installation comprises at least one security ventil. Preferably, the hydrogen duct system installation comprises at least one component of a H2 refueling system for fueling a hydrogen tank with H2 and/or for venting a hydrogen tank during fueling. Preferably, the hydrogen duct system installation comprises a H2 system unit combining at least two of the aforementioned components or functions.

According to another aspect the invention provides an aircraft comprising a hydrogen duct system arrangement as mentioned before.

According to another aspect, the invention provides an operation method for a variable fairing, a hydrogen duct system arrangement, and/or an aircraft according to any of the aforementioned embodiments. The operation method comprises open the variable fairing on ground for allowing hydrogen to escape upwards and closing the fairing during flight allowing airflow through the fairing via the air inlet and the air outlet.

Preferably, the variable fairing is opened during a lower flight speed and closed during a higher flight speed.

According to another aspect, the invention provides a computer program comprising instructions for carrying out the operation method according to any of the aforementioned embodiments. For example, the fairing may be provided together with a medium with the computer program that may be loaded into a computing device of the aircraft which then will be connected to actors of the fairing.

Preferred embodiments of the invention relate to a variable fairing for hydrogen installations.

Preferred embodiments of the invention support the installations of hydrogen system on an aircraft. When an aircraft has at least one hydrogen consumer such as a fuel cell or an engine powered at least partially with hydrogen, a hydrogen system for supplying the hydrogen consumer is needed on the aircraft. The hydrogen system especially includes a hydrogen duct system with pipes, couplings, pipe branches, equipment and so on for transporting, especially distributing the hydrogen, which may be liquid hydrogen (LH2, especially cryogenic) or gaseous hydrogen (GH2). In order to integrate such hydrogen system or hydrogen duct system in or on the aircraft, system installations are necessary. Especially, at least some of the following system components have to be provided on the aircraft:

a H2 feed unit for supplying the hydrogen consumer with hydrogen a H2 refueling unit for fueling and venting a H2 tank a vent system, especially with a releasing unit in order to release H2 in emergency or failure conditions.

Currently, all concepts for hydrogen pipe installations are installing the system (pipes and equipment) inside the aircraft.

One idea is to provide at least parts of one or several of such H2 system installations outside of an aircraft part, especially outside of an aircraft fuselage, so that H2 leaking from such installation parts or H2 installation components does not enter the interior of the fuselage such as a passenger cabin or a loading compartment or any other volume inside. Preferably such H2 installations are mounted on top of the aircraft part, especially on top of the fuselage. An installation of H2 system components containing or transporting hydrogen outside of the fuselage, especially on top of the fuselages avoids an accumulation of H2 leaking from such components inside of the fuselage. This creates another challenge, the system components mounted outside of the corresponding aircraft part such as the fuselage should be covered by a fairing in order to avoid aerodynamic noise in flight. Air can be guided through the fairing in flight in order to avoid hydrogen accumulation. On ground, there is no airflow available. Preferred embodiments of the invention avoid an accumulation of hydrogen even in such situation.

Preferred embodiments of the invention provide a significant contribution to the development of a pure hydrogen fueled aircraft. According to preferred embodiments the hydrogen system shall be installed on top of the aircraft fuselage. Hydrogen leakage has to be taken into account and accumulation of hydrogen should be avoided as far as possible.

Preferred embodiments of the invention relate to a fairing that can be opened when the airflow through it is too small or when there is a risk of hydrogen accumulation. The opening function solves the problem that a fairing is needed in flight and the problem if hydrogen accumulation inside the fairing when the aircraft is on ground and no "natural" ventilation is available. An advantage is that there is no ground ventilation required to prevent hydrogen accumulation.

According to some embodiments, a fairing is provided with an air inlet, an air outlet and one or two or more fairing doors on top of the fuselage. Preferably, the fairing doors are split along the longitudinal axis of the aircraft. The air inlet and the air outlet are preferably fixed assemblies before and aft the fairing doors. Preferably, the fairing doors are hinged at the lower part to the fuselage. Preferably, the fairing doors can be opened and closed by an actuating system. The fairing shall be closed during flight and shall provide an airflow through it sufficient to avoid critical accumulation of hydrogen. On ground and at low speed the fairing shall be open to allow the hydrogen to escape from the aircraft upwards (hydrogen is lighter than air), avoiding also critical accumulation.

Fairings with a fixed air inlet and a fixed air outlet for ventilation purposes are in principle known from some aircraft applications for other purposes. Large doors that can be opened and closed during flight are also known from aircraft landing gear systems, see, e.g., prior art citation [5]. Preferred embodiments of the invention combine aspects of these constructions which result in a system that can effectively and easily avoid critical accumulations of hydrogen in all operating phases.

BRIEF DESCRIPTION OF THE DRAWINGS

Embodiments of the invention are explained below referring to the accompanying drawings in which.

DETAILED DESCRIPTION OF THE PREFERRED EMBODIMENTS

Figure 1:
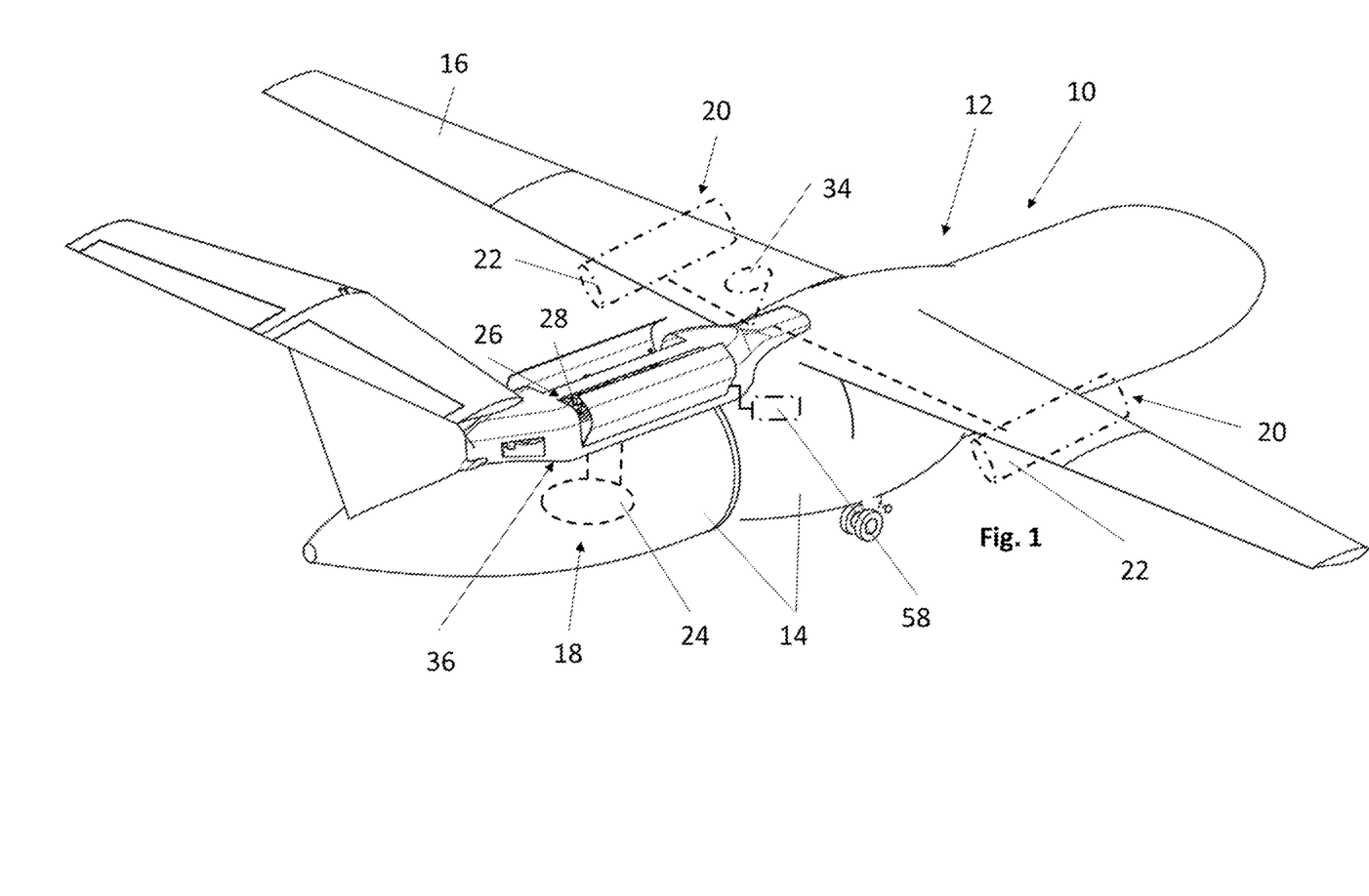
FIG. 1 is a perspective view of an aircraft having a hydrogen system including a hydrogen duct system with hydrogen duct system installations outside of a fuselage and a variable fairing covering the hydrogen duct system installations.
Figure 2:
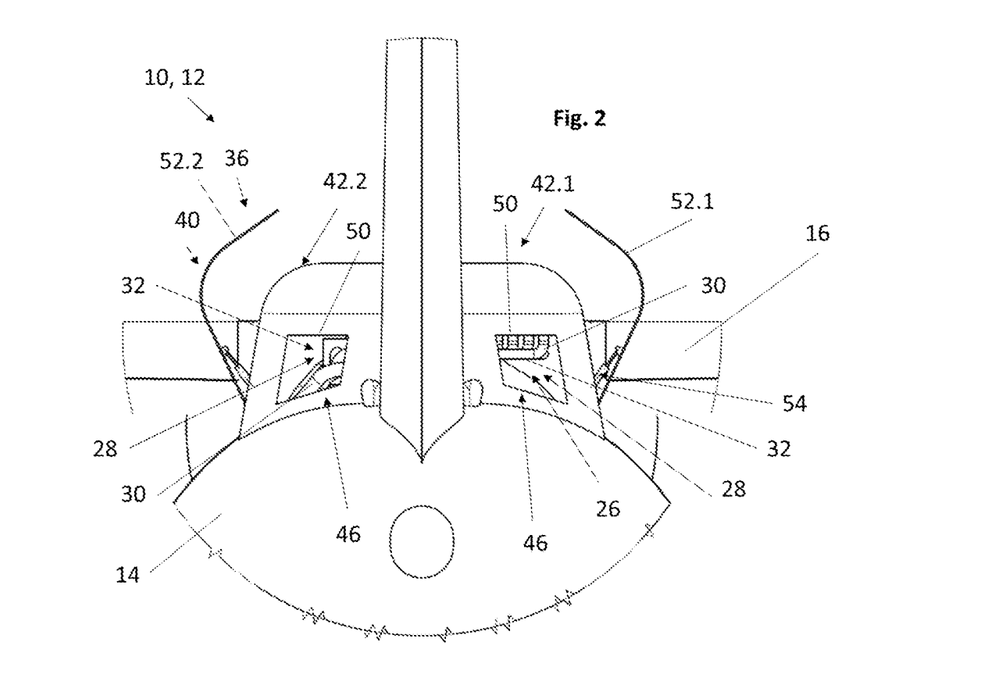
FIG. 2 is a rear view of an upper part of the aircraft.
Figure 3:
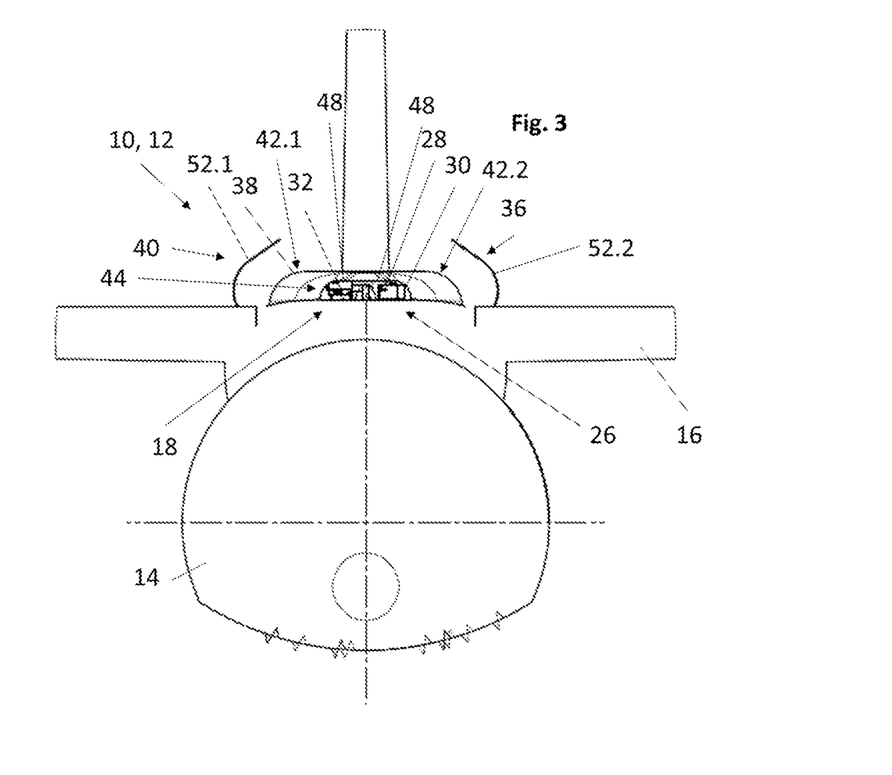
FIG. 3 is a front view of the upper part of the aircraft.
Figure 4:
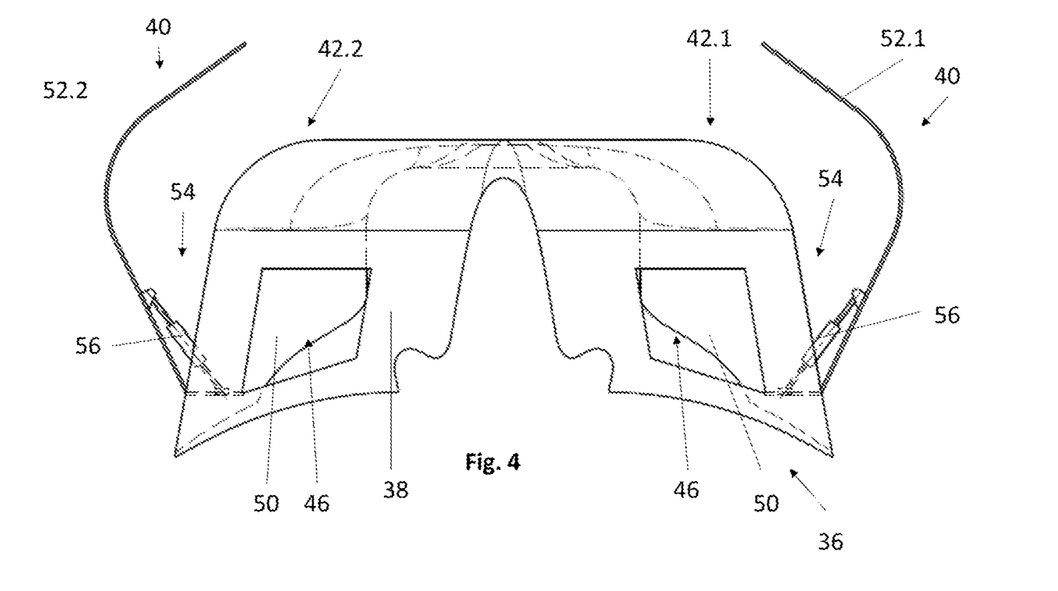
FIG. 4 is a rear view of the variable fairing in an open state.

FIGS. 1 to 3 show an aircraft 10, here in form of an airplane 12, having a fuselage 14 and a wing construction 16. Further, the aircraft 10 comprises a hydrogen system 18 for supplying at least one hydrogen consumer 20 such as a fuel cell (not shown) or hydrogen-powered engines 22. The hydrogen system 18 comprises at least one hydrogen tank 24 and a hydrogen duct system 26. The hydrogen duct system 26 comprises hydrogen duct system installations 28 mounted outside of an aircraft part 14, 16, especially outside of the fuselage 14. Especially, the hydrogen duct system installations 28 are mounted on top of the fuselage 14.

In FIG. 1, the engines 22 are arranged on the wing construction 16, in other embodiments at least one of the hydrogen-powered engines 22 is mounted at another aircraft part, especially at a rear portion of the fuselage 14.

The hydrogen duct system 26 is configured to transport hydrogen, to supply the hydrogen consumer 20 with hydrogen, to refuel the hydrogen tank 24, to compensate or control pressure variations in the hydrogen system 18, especially during hydrogen supply and refueling and in the event of any failure of any hydrogen system component, and so on. Accordingly, the hydrogen duct installations 28 may comprise at least one pipe 30 for transporting H2, especially liquid H2 or gaseous H2, at least one pipe coupling (not shown), at least one component of a H2 feed unit for supplying an hydrogen consumer of the aircraft with hydrogen, at least one valve, especially automatic valve, controllable valve and/or security valve, at least one vent system for releasing H2 to the outside, and at least one component of a H2 refueling system for fueling a hydrogen tank with H2 and/or for venting an hydrogen tank during fueling. Especially, the hydrogen duct system and equipment installations 28 may comprise at least a H2 system unit 32 combining at least two of the aforementioned components. For example, the H2 system unit 32 comprises pipes 30 connecting the hydrogen tank 24 and the hydrogen consumer 20 mounted, for example, on the wing structure construction 16 or in or on another aircraft part, pipes 30 connecting the hydrogen tank 24 with a H2 fueling port 34 located on the bottom side of a wing of the wing construction 16, and valves for controlling hydrogen flow and hydrogen pressure.

Since the hydrogen duct and equipment installations 28 are mounted outside the fuselage 14, H2 leaking from the hydrogen installations 28 or released from a security valve will not accumulate in the fuselage 14.

Referring to FIGS. 1 to 3, the aircraft 10 further comprises a variable fairing 36 covering the hydrogen duct system and equipment installations 28 for reducing noise during flight.

A preferred embodiment of the variable fairing 36 will now be explained in more detail with reference to FIGS. 4 to 7 showing the fairing 36 alone in different states and with different views.

The fairing 36 has at least one fairing body 38 configured to be mounted on top of the fuselage 14 and a movable closure mechanism 40 for opening and closing at least one top portion 42.1, 42.2 of the fairing 36. Further, the fairing 36 comprises an air inlet 44 and an air outlet 46.

The air inlet 44 comprises one or several fixed inlet openings 48 in a front portion of the fairing 36. The air outlet 46 comprises one or several fixed outlet openings 50 in the rear part of the fairing 36. The inlet opening(s) 48 and outlet openings 50 are configured, especially arranged, dimensioned and formed, such that during flight of the aircraft 10 an airflow is provided within the fairing 36 which prevents accumulation of H2 within the fairing 36 while noise production is minimized.

In the embodiment shown, the air inlet 44 and the air outlet 46 are provided at the front part and the rear part, respectively, of the fairing body 38 formed as one piece. In other embodiments (not shown) the fairing 36 includes a front fairing body with the air inlet 44 and a rear fairing body with the air outlet 46.

The fairing 36 comprises at least one open top portion 42.1, 42.2 that can be opened and closed by the closure mechanism 40. The closure mechanism 40 comprises at least one fairing door 52.1, 52.2 movable by an actuating apparatus 54. The construction of the fairing door 52.1, 52.2 may be similar to known aircraft landing gear doors. Hence, the at least one fairing door may be configured to be hinged to the fuselage 14 between the front fairing body and the rear fairing body. In the embodiment shown, the fairing body 38 has a first open top portion 42.1 to be opened and closed by a first fairing door 52.1 and a second open top portion 42.2 to be opened and closed by a second fairing door 52.2. While different door constructions are possible, the fairing doors 52.1, 52.2 of the embodiments shown are hinged doors hinged to a side portion of the fairing body 38.

The actuation apparatus 54 comprises at least one actor such as a linearly movably telescopic cylinder 56 that may be powered by any known means, e.g., electrically, hydraulically or pneumatically. Further, the actuation apparatus 54 comprises a control 58 for controlling movement and position of the movable closure mechanism 40, especially of the at least one fairing door 52.1, 52.2. The control 58 is an electronic control, especially a computing device with corresponding software. The control 58 may be located at the fairing 36 or may be located within the aircraft 10. Especially, the control 58 may be part of the control system of the aircraft 10. The control 58 is connected to the actors and achieves flight condition information from different sensors such as speed sensors, acceleration sensors and so on. The fairing 36 may be equipped with a gas sensor (not shown) determining H2 concentration within the fairing 36.

Figure 5:
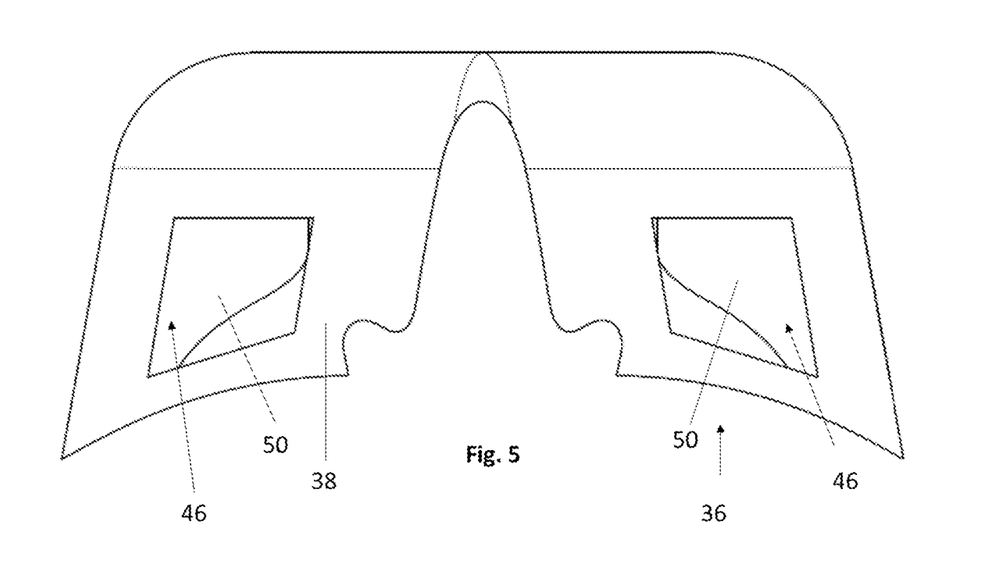
FIG. 5 is a rear view of the variable fairing in a closed state.
Figure 6:
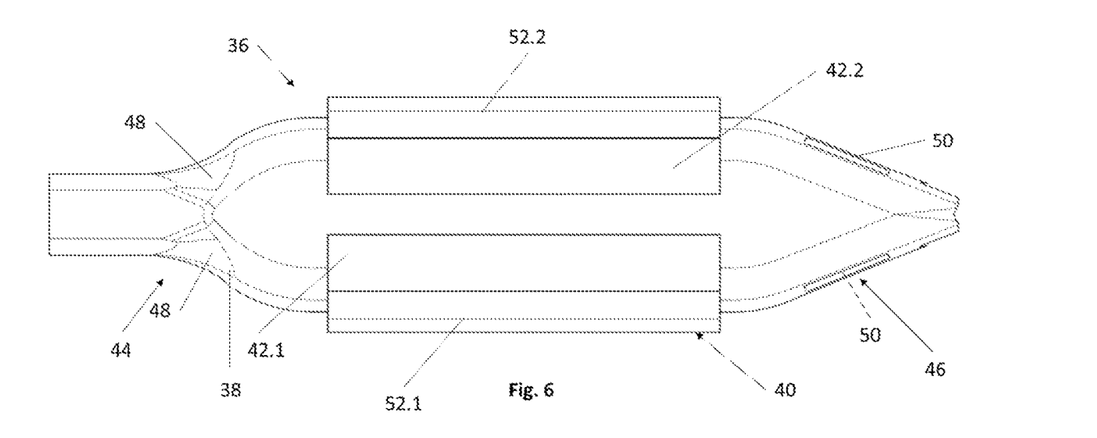
FIG. 6 is a top view of the variable fairing in the open state.
Figure 7:
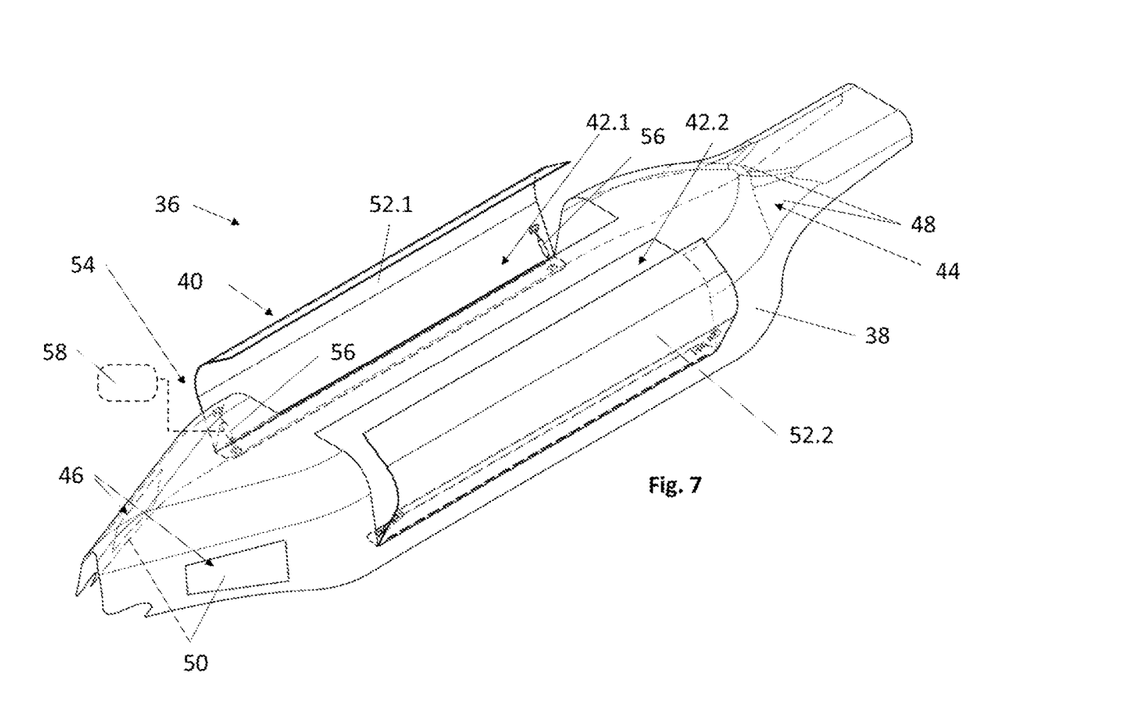
FIG. 7 is a perspective view of the variable fairing.

The control 58 is configured to open and close the at least one top portion 42.1, 42.2 depending on flight and ground conditions, moving (flying or rolling) speed of the aircraft and/or from H2 concentration within the fairing 36. Especially, the fairing 36 is in an open state such as shown in FIGS. 1 to 4, 6 and 7, wherein the at least one fairing door 52.1 is fully or partially open, when the aircraft 10 is on ground or is moving with a low speed. The fairing 36 is in a closed state such as shown in FIG. 5 during flight (at least with a higher speed).

In the open state, any H2 leaking from the hydrogen duct system installations 28 on top of the fuselage 14 is released through the at least one open top portion 42.1, 42.2 since hydrogen is lighter than air. Therefore, there is no need for a forced ventilation of the fairing 36 during ground condition although no airflow is present within the fairing 36.

In order to enhance, with simple means, security of a hydrogen system 18 of an aircraft 10, a variable fairing 36 has been proposed for covering a hydrogen duct system and equipment installation 28 on the outside of an aircraft part 14, 16, wherein the fairing 36 comprises at least one fairing body 38 to be mounted on the aircraft part 14, 16, an air inlet 44 and an air outlet 46 and at least one movable closure mechanism 40 configured to open and close a top portion 42.1, 42.2 of the fairing 36.

The systems and devices described herein may include a controller, control unit, controlling means, system control or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 airplane
14 fuselage (example for aircraft part)
16 wing construction
18 hydrogen system
20 hydrogen consumer
22 engine
24 hydrogen tank
26 hydrogen duct system
28 hydrogen duct system installation
30 pipe
32 hydrogen system unit
34 H2 fueling port
36 fairing
38 fairing body
40 closure mechanism
42.1 first open top portion
42.2 second open top portion
44 air inlet
46 air outlet
48 inlet opening
50 outlet opening
52.1 first fairing door
52.2 second fairing door
54 actuating apparatus
56 telescopic cylinder
58 control

The invention claimed is:

1. A hydrogen duct system arrangement for an aircraft, comprising:
 a hydrogen duct system installation mounted on an outside of a fuselage of the aircraft, and
 a variable fairing for covering the hydrogen duct system installation, wherein the fairing comprises at least one fairing body to be mounted on the outside of the fuselage, an air inlet and an air outlet and at least one movable closure mechanism configured to open and close a top portion of the fairing.

2. The hydrogen duct system arrangement according to claim 1, wherein the hydrogen duct system installation is mounted on a top of the fuselage.

3. The hydrogen duct system arrangement according to claim 1, wherein the closure mechanism comprises at least one or several of the following:
 a first fairing door,
 a second fairing door, or
 an actuating apparatus for driving a movement of the closure mechanism.

4. The hydrogen duct system arrangement according to claim 3, wherein the closure mechanism comprises the first fairing door and the second fairing door, and wherein the first and the second fairing door are at least one of:
 split along a longitudinal axis of at least one of the fairing or the fuselage, or configured to be hinged to fuselage or to the fairing body.

5. The hydrogen duct system arrangement according to claim 1, wherein the air inlet and the air outlet comprise fixed openings in the at least one fairing body.

6. The hydrogen duct system arrangement according to claim 5, wherein the outlet comprises two fixed outlet openings in the rear part of the fairing.

7. The hydrogen duct system arrangement according to claim 5, wherein the inlet comprises one fixed outlet openings in the front part of the fairing.

8. The hydrogen duct system arrangement according to claim 1, comprising a control configured to control the movable closure mechanism depending on at least one or several of the following:
 a flight condition of an aircraft,
 an aircraft speed,
 a ground condition of the aircraft, or
 a hydrogen accumulation within the fairing.

9. The hydrogen duct system arrangement according to claim 1, wherein the hydrogen duct system installation comprises at least one of the following components:
 at least one pipe for transporting hydrogen (H2),
 at least one pipe coupling,
 at least one component of a H2 feed unit for supplying a hydrogen consumer of the aircraft with hydrogen,
 at least one valve,
 at least one vent system for releasing H2 to the outside,
 at least one security valve,
 at least one component of a H2 refueling system for at least one of fueling a hydrogen tank with H2 or venting a hydrogen tank during fueling, or
 a H2 system unit combining at least two of the aforementioned components.

10. An aircraft comprising a hydrogen duct system arrangement according to claim 1.

11. An operation method for a hydrogen duct system arrangement according to claim 1, comprising opening the variable fairing on ground for allowing hydrogen to escape upwards and closing the fairing during flight allowing airflow through the fairing via the air inlet and the air outlet.

12. The operation method according to claim 11, wherein the variable fairing is opened during a lower aircraft moving speed and closed during a higher aircraft moving speed.

13. A non-transitory computer-readable medium having stored thereon instructions to execute the steps of an operation method for a hydrogen duct system arrangement according to claim 1, comprising opening the variable fairing on ground for allowing hydrogen to escape upwards and closing the fairing during flight allowing airflow through the fairing via the air inlet and the air outlet.

14. The hydrogen duct system arrangement according to claim 1, wherein the closure mechanism comprises an actuating apparatus for driving a movement of the closure mechanism, wherein the actuating apparatus comprises a linearly movably telescopic cylinder.

* * * * *